(12) United States Patent
Adams et al.

(10) Patent No.: US 9,043,393 B2
(45) Date of Patent: May 26, 2015

(54) METHOD AND SYSTEM FOR UPDATING AN ELECTRONIC MAIL ADDRESS BOOK

(75) Inventors: Neil Adams, Waterloo (CA); Larry E. Kuhl, Waterloo (CA); Raymond Vander Veen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1251 days.

(21) Appl. No.: 11/266,198

(22) Filed: Nov. 4, 2005

(65) Prior Publication Data

US 2007/0106728 A1 May 10, 2007

(51) Int. Cl.
*G06F 15/16* (2006.01)
*G06F 15/173* (2006.01)
*G06Q 10/10* (2012.01)

(52) U.S. Cl.
CPC .................................. *G06Q 10/107* (2013.01)

(58) Field of Classification Search
USPC ......................................... 709/204, 224, 203
See application file for complete search history.

(56) References Cited

U.S. PATENT DOCUMENTS

| 6,339,795 | B1 | 1/2002 | Narurkar et al. | |
| 6,711,624 | B1 | 3/2004 | Narurkar et al. | |
| 6,741,232 | B1* | 5/2004 | Siedlikowski et al. | 345/156 |
| 6,760,728 | B1 | 7/2004 | Osborn | |
| 6,895,426 | B1* | 5/2005 | Cortright et al. | 709/206 |
| 6,985,926 | B1* | 1/2006 | Ferlauto et al. | 709/206 |
| 2002/0057765 | A1* | 5/2002 | Hyziak et al. | 379/52 |
| 2004/0059784 | A1 | 3/2004 | Caughey | |
| 2004/0267792 | A1* | 12/2004 | Kobayashi | 707/100 |

FOREIGN PATENT DOCUMENTS

WO WO-2004/028123 A1 * 4/2004 ............. H04M 1/57

OTHER PUBLICATIONS

Crocker, RFC 822, "Standard for the Format of ARPA Internet Text Messages", 1982, Internet Engineering Task Force.*
Anonymous: "AddressGrabber Standard"Internet Article; "Online" Apr. 1, 2005, pp. 1-2, XP002365845 RetrieVed from the Internet. URL:http://web.archive.org/web/20050401015208/http://www.egrabber.com/addressgrabberdeluxe/index.html>"retrieved on Jan. 27, 2006" the whole document.
Ericsson: "Mobile Phone T65" Manual Ericsson T65; Jan. 2002, pp. 24-28, 34, XP002268978 pp. 26, 35.
Choi, Richin—Canadian Intellectual Property Office, "Examiner's Requisition" for corresponding Canadian Patent Application No. 2,565,885, dated May 16, 2012, Canada.
Norton Rose Canada LLP, "Response to Examiner's Requisition" for corresponding Canadian Patent Application No. 2,565,885, dated Aug. 30, 2012, Canada.

(Continued)

*Primary Examiner* — Karen Tang
(74) *Attorney, Agent, or Firm* — Ridout and Maybee LLP (57) ABSTRACT

A method for updating an electronic mail ("email") address book comprising: determining whether an email message presented to a user on a display screen of a data processing system contains address information; and, if the email message contains address information: identifying the address information in the email message; determining whether the address information is contained in one or more contact records in the email address book; and, if the address information is not contained in one or more contact records, presenting first means to the user on the display screen for generating a command to add a new contact record to the address book for the address information.

17 Claims, 7 Drawing Sheets

(56) References Cited

OTHER PUBLICATIONS

Canadian Intellectual Property Office, Office Action Response Dated Oct. 10, 2013, submitted for Canadian Patent Application No. 2,565,885.

Canadian Intellectual Property Office, Office Action Dated Apr. 12, 2013, issued in Canadian Patent Application No. 2,565,885.

Canadian Intellectual Property Office, Office Action dated Jan. 16, 2014, issued in Canadian Patent Application No. 2,565,885.

* cited by examiner

410 { Dear Jane:

How are you doing?

Best Regards,

420 {
John Doe ---- 421, 422
200 Anywhere Street ---- 423, 424, 425
Smalltown, ON ---- 426, 427
Canada ---- 428
A1A 2B2 ---- 429
Telephone: 905-123-4567 ---- 430
Fax: 905-123-4568 ---- 431
Email: jdoe@smalltown.com ---- 432

METHOD AND SYSTEM FOR UPDATING AN ELECTRONIC MAIL ADDRESS BOOK

FIELD OF THE INVENTION

This invention relates to the field of electronic mail ("email") messages, and more specifically, to updating email address books by detecting and importing address information in email messages received by wireless and other devices.

BACKGROUND

Current wireless mobile communication devices include microprocessors, memory, soundcards, and run one or more software applications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms.

With respect to email messages, a typical message often contains contact and address information for the sender of the email. This information may be included in emails for a number of reasons. For example, a user may send address updates via email. If the user moves to a new home, the user may send an email message to friends informing them of the user's change of address. Auto signatures are another example. An auto signature is text that is automatically included at the end of an email message. It is generated by the user's email system. Typically, an auto signature contains the mailing address of the user as well as other contact information for the user such as the user's telephone number(s) and email address.

When a second user receives updated address information from a first user via email, the second user will typically wish to add this new information to the second user's address book function maintained by the second user's email system. The address book function typically stores a list of contacts in a database. A record is maintained for each contact and the contact information may be presented for editing, etc., through a multi-field input screen or graphical user interface. One problem with current email systems is that they do not provide effective means of facilitating the addition of new or updated address information to address books when the new or updated information is received by email. Presently, if a user wants to add new or updated address information to their address book, the user has to copy each line of the address from the source email individually, switch to their address book input screen, and then paste the line into the appropriate field on the address book input screen. This can be time consuming and frustrating process.

Therefore, one shortcoming of present wireless and other devices is their inability to effectively update address books with address information received by email. Furthermore, the need to effectively update contact information is increasing in importance with the increase in the number of email related applications being run on wireless and other devices.

A need therefore exists for an effective method and system for updating address information for email address books in wireless and other devices. Accordingly, a solution that addresses, at least in part, the above and other shortcomings is desired.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EMBODIMENTS

According to one aspect of the invention, there is provided a method for updating an electronic mail ("email") address book comprising: determining whether an email message presented to a user on a display screen of a data processing system contains address information; and, if the email message contains address information: identifying the address information in the email message; determining whether the address information is contained in one or more contact records in the email address book; and, if the address information is not contained in one or more contact records, presenting first means to the user on the display screen for generating a command to add a new contact record to the address book for the address information.

Optionally, the method further includes, if the address information is contained in one or more contact records, presenting second means to the user on the display screen for generating a command to add the address information to the one or more contact records and to identify the address information in the one or more contact records. Optionally, the method further includes: displaying an input screen to the user for the new contact record or the one or more contact records; and, receiving input from the user to at least one of: add information to the new contact record or to the one or more contact records; and, correct information in the new contact record or in the one or more contact records. Optionally, the identifying is underlining. Optionally, the first and second means are at least one of a first and a second menu item and a first and a second button icon, respectively. Optionally, the address information includes one or more items, the one or more items including at least one of: a street type, a street type abbreviation, a street number, a street name, a city name, a province name, a province name abbreviation, a state name, a state name abbreviation, a country name, a country name abbreviation, a postal code, a ZIP code, a telephone number, a fax number, an email address, and a personal identification number ("PIN"). Optionally, the step of determining whether the email message contains address information further includes: searching for at least one of the one or more items in the email message; identifying a number of the one or more items in a section of the email message; and comparing the number to a predetermined number to determine if the one or more items represent an address. Optionally, the data processing system is a wireless device having a clickable thumbwheel. Optionally, the method further includes opening the email message on the display screen when the email message is selected from a list of email messages by the user with the clickable thumbwheel.

In accordance with further aspects of the present invention there is provided an apparatus such as a data processing system or wireless device, a method for adapting this system or device, as well as articles of manufacture such as a computer readable medium having program instructions recorded thereon for practising the method of the invention.

The following detailed description of the embodiments of the present invention does not limit the implementation of the invention to any particular computer programming language. The present invention may be implemented in any computer programming language provided that the operating system ("OS") provides the facilities that may support the requirements of the present invention. An embodiment is implemented in the JAVA™ computer programming language (or other computer programming languages such as C or C++). (JAVA and all JAVA-based trademarks are the trademarks of Sun Microsystems Corporation.) Any limitations presented would be a result of a particular type of operating system or computer programming language and would not be a limitation of the present invention.

Figure 1:
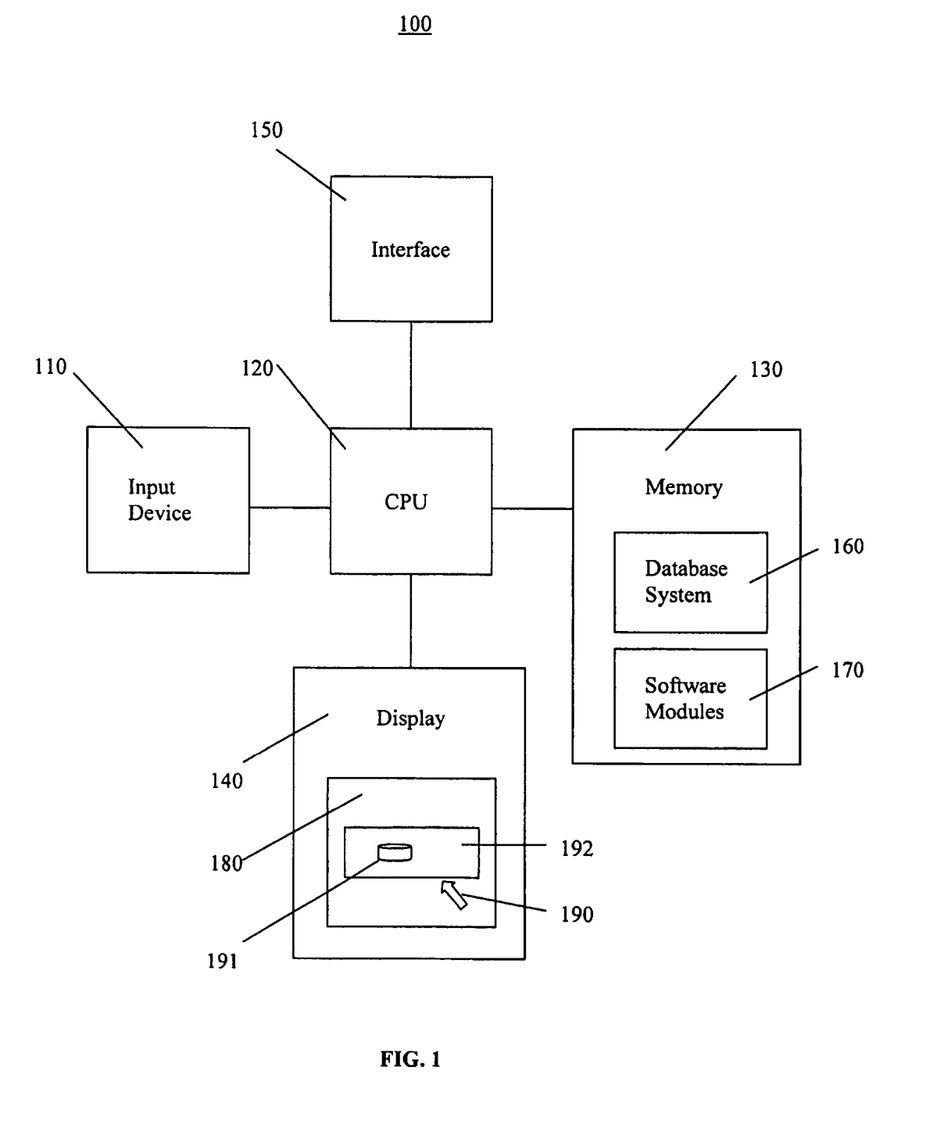
FIG. 1 is a block diagram illustrating a data processing system adapted for implementing an embodiment of the invention.

FIG. 1 is a block diagram illustrating a data processing system 100 adapted for implementing an embodiment of the invention. The data processing system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection and a wireless network 220 connection (see FIG. 2). The data processing system 100 is adapted for communicating with wireless devices 210 over a wireless network 220.

The data processing system 100 may be a server system or a personal computer ("PC") system. The CPU 120 of the system 100 is operatively coupled to memory 130 which stores an operating system (not shown), such as IBM Corporation's OS/2™, UNIX, etc., for general management of the system 100. The interface 150 may be used for communicating to external data processing systems (not shown) through a network (such as the Internet) or wireless network 220 (see FIG. 2). Examples of suitable platforms for the system 100 include iSeries™ servers and ThinkCentre™ personal computers available from IBM Corporation. The system 100 may include application server software (not shown), such as WebLogic® Server available from BEA Systems, Inc., for developing and managing distributed applications.

The data processing system 100 may include a database system 160 for storing and accessing programming information. The database system 160 may include a database management system ("DBMS") and a database and is stored in the memory 130 of the data processing system 100.

The data processing system 100 includes computer executable programmed instructions for directing the system 100 to implement the embodiments of the present invention. The programmed instructions may be embodied in one or more software modules 170 resident in the memory 130 of the data processing system 100. Alternatively, the programmed instructions may be embodied on a computer readable medium (such as a CD disk or floppy disk) which may be used for transporting the programmed instructions to the memory 130 of the data processing system 100. Alternatively, the programmed instructions may be embedded in a computer-readable, signal-bearing medium that is uploaded to a network by a vendor or supplier of the programmed instructions, and this signal-bearing medium may be downloaded through the interface 150 to the data processing system 100 from the network by end users or potential buyers.

The CPU 120 of the system 100 is typically coupled to one or more devices 110 for receiving user commands or queries and for displaying the results of these commands or queries to the user on a display 140. As mentioned, the memory 130 may include a variety of storage devices including internal memory and external mass storage typically arranged in a hierarchy of storage as understood to those skilled in the art.

A user may interact with the data processing system 100 and its software modules 170 using a graphical user interface ("GUI") 180. The GUI 180 may be web-based and may be used for monitoring, managing, and accessing the data processing system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Figure 2:
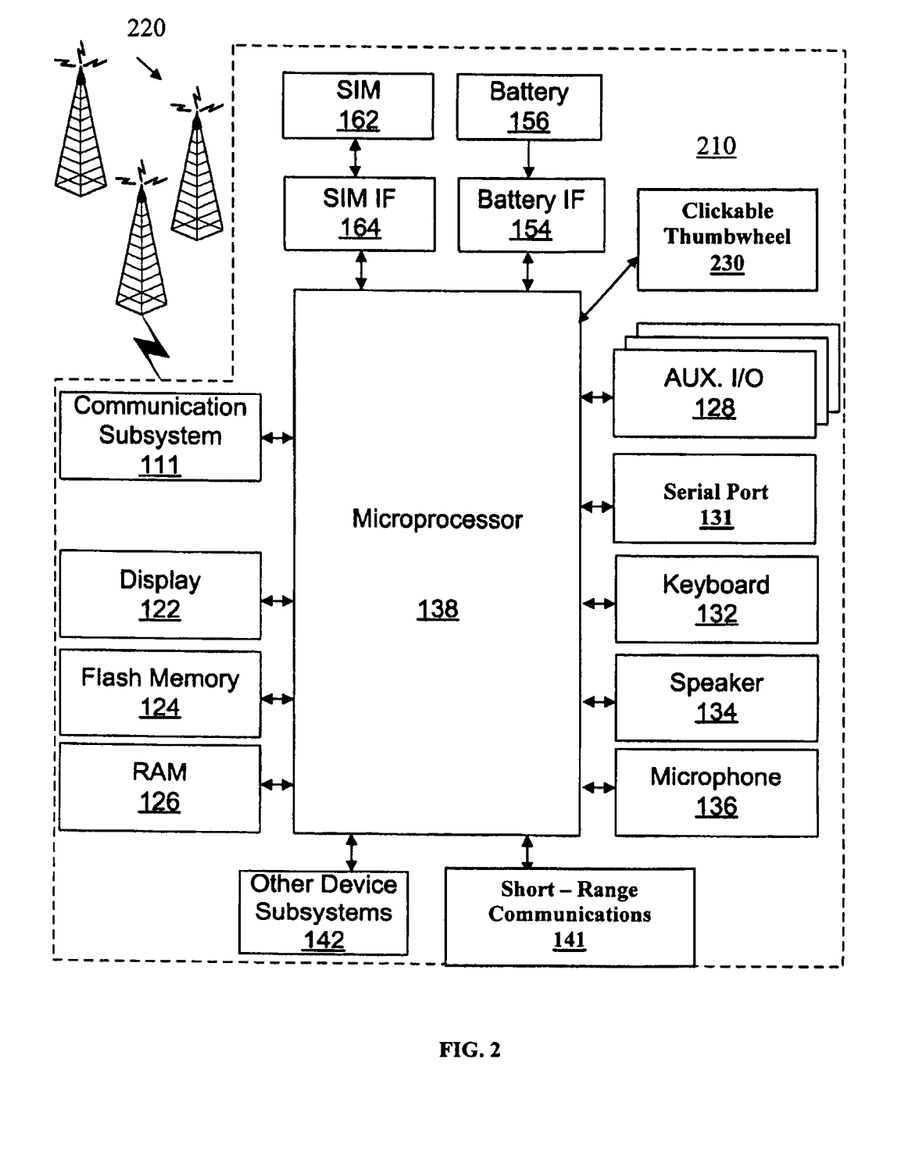
FIG. 2 is a block diagram illustrating a wireless device and a wireless communications system adapted for implementing an embodiment of the invention.

FIG. 2 is a block diagram illustrating a wireless device 210 and a wireless network 220 adapted for implementing an embodiment of the invention. The wireless network 220 includes antenna, base stations, and supporting radio equipment, known to those of ordinary skill in the art, for supporting wireless communications between the wireless device 210 and the data processing system 100. The wireless network 220 may be coupled to a wireless network gateway (not shown) and to a wide area network (not shown) to which the data processing system 100 may be coupled through its interface 150.

The wireless device 210 is a two-way communication device having at least voice and advanced data communication capabilities, including the capability to communicate with other computer systems 100. Depending on the functionality provided by the device 210, it may be referred to as a data messaging device, a two-way pager, a cellular telephone with data messaging capabilities, a wireless Internet appliance, or a data communication device (with or without telephony capabilities). The device 210 may communicate with any one of a plurality of fixed transceiver stations 220 within its geographic coverage area.

The wireless device 210 will normally incorporate a communication subsystem 111, which includes a RF receiver, a RF transmitter, and associated components, such as one or more (optionally embedded or internal) antenna elements, local oscillators ("LOs"), and a processing module such as a digital signal processor ("DSP") (all not shown). As will be apparent to those skilled in the field of communications, the particular design of the communication subsystem 111 depends on the communication network 220 in which the device 210 is intended to operate.

Network access is associated with a subscriber or user of the device 210 and therefore the device 210 typically has a Subscriber Identity Module (or "SIM" card) 162 to be inserted in a SIM interface ("IF") 164 in order to operate on the network (e.g., a GSM network). The device 210 is a battery-powered device so it also includes a battery IF 154 for receiving one or more rechargeable batteries 156. Such a battery 156 provides electrical power to most if not all electrical circuitry in the device 210, and the battery IF 154 provides for a mechanical and electrical connection for it. The battery IF 154 is coupled to a regulator (not shown) which provides power to the circuitry of the device 210.

The wireless device 210 includes a microprocessor 138 which controls overall operation of the device 210. Communication functions, including at least data and voice communications, are performed through the communication subsystem 111. The microprocessor 138 also interacts with additional device subsystems such as a display 122, a flash memory 124 or other persistent store, a random access memory ("RAM") 126, auxiliary input/output ("I/O") subsystems 128, a serial port 131, a keyboard 132, a clickable thumbwheel 230, a speaker 134, a microphone 136, a short-range communications subsystem 141, and any other device subsystems generally designated at 142. Some of the subsystems shown in FIG. 2 perform communication-related functions, whereas other subsystems may provide "resident" or on-device functions. Notably, some subsystems, such as the keyboard 132, display 122, and clickable thumbwheel 230, for example, may be used for both communication-related functions, such as entering a text message for transmission over a communication network, and device-resident functions such as a calculator or task list. Operating system software used by the microprocessor 138 is optionally stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, optionally enables execution of software applications on the device 210. A predetermined set of applications which control basic device operations, including at least data and voice communication applications, will normally be installed on the device 210 during its manufacture. An application that may be loaded onto the device 210 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 210 and SIM 162 to facilitate storage of PIM data items and other information.

The PIM application optionally has the ability to send and receive data items via the wireless network 220. In one embodiment, PIM data items are seamlessly integrated, synchronized, and updated via the wireless network, with the wireless device user's corresponding data items stored and/or associated with a host computer system such as the data processing system 100 thereby creating a mirrored host computer on the device 210 with respect to such items. This is especially advantageous where the host computer system is the wireless device user's office computer system. Additional applications may also be loaded onto the device 210 through the network 220, the auxiliary I/O subsystem 128, the serial port 131, the short-range communications subsystem 141, or any other suitable subsystem 142, and installed by a user in RAM 126 or optionally in a non-volatile store (not shown) for execution by the microprocessor 138. Such flexibility in application installation increases the functionality of the device 210 and may provide enhanced on-device functions, communication-related functions, or both. For example, secure communication applications may enable electronic commerce functions and other such financial transactions to be performed using the wireless device 210.

In a data communication mode, a received signal such as a text message, an email message, or web page download will be processed by the communication subsystem 111 and input to the microprocessor 138. The microprocessor 138 will optionally further process the signal for output to the display 122 and/or to the auxiliary I/O device 128. A user of the wireless device 210 may also compose data items, such as email messages, for example, using the keyboard 132 in conjunction with the display 122, the clickable thumbwheel 230, and possibly the auxiliary I/O device 128. The keyboard 132 is optionally a complete alphanumeric keyboard and/or a telephone-type keypad. These composed items may be transmitted over a communication network 220 through the communication subsystem 111 or the short range communication subsystem 141.

For voice communications, the overall operation of the wireless device 210 is substantially similar, except that the received signals would be output to the speaker 134 and signals for transmission would be generated by the microphone 136. Alternative voice or audio I/O subsystems, such as a voice message recording subsystem, may also be implemented on the device 210. Although voice or audio signal output is optionally accomplished primarily through the speaker 134, the display 122 may also be used to provide, for example, an indication of the identity of a calling party, duration of a voice call, or other voice call related information.

The serial port 131 shown in FIG. 2 is normally implemented in a personal digital assistant ("PDA")-type communication device for which synchronization with a user's desktop computer is a desirable, albeit optional, component. The serial port 131 enables a user to set preferences through an external device or software application and extends the capabilities of the device 210 by providing for information or software downloads to the device 210 other than through a wireless communication network 220. The alternate download path may, for example, be used to load an encryption key onto the device 210 through a direct and thus reliable and trusted connection to thereby provide secure device communication.

The short-range communications subsystem 141 shown in FIG. 2 is an additional optional component which provides for communication between the device 210 and different systems or devices, which need not necessarily be similar devices. For example, the subsystem 141 may include an infrared device and associated circuits and components, or a Bluetooth™ communication module to provide for communication with similarly-enabled systems and devices. (Bluetooth™ is a registered trademark of Bluetooth SIG, Inc.)

Figure 3:
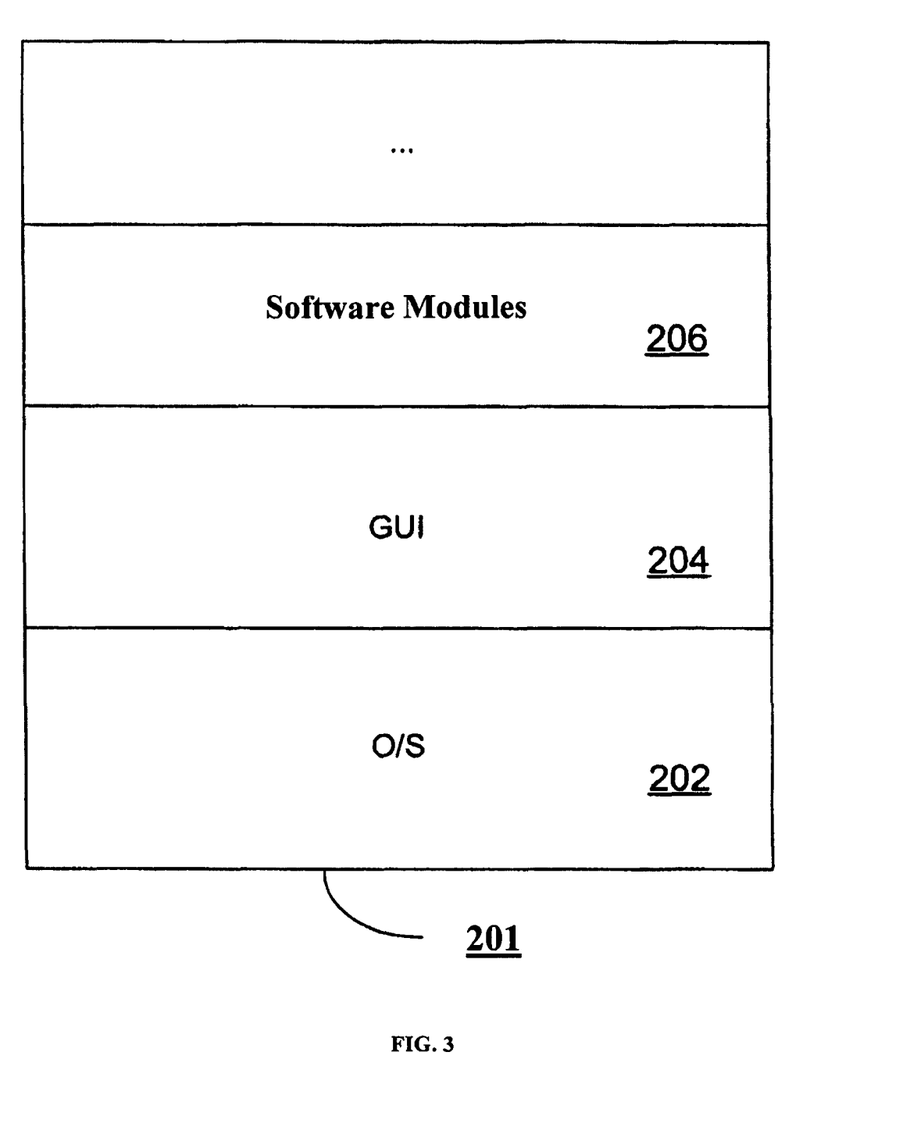
FIG. 3 is a block diagram illustrating a memory of the wireless device of FIG. 2.

FIG. 3 is a block diagram illustrating a memory 201 of the wireless device 210 of FIG. 2. The memory 201 has various software components for controlling the device 210 and may include flash memory 124, RAM 126, or ROM (not shown), for example. In accordance with an embodiment of the invention, the wireless device 210 is intended to be a multi-tasking wireless communications device configured for sending and receiving data items and for making and receiving voice calls. To provide a user-friendly environment to control the operation of the device 210, an operating system ("O/S") 202 resident on the device 210 provides a basic set of operations for supporting various applications typically operable through a graphical user interface ("GUI") 204. For example, the O/S 202 provides basic input/output system features to obtain input from the auxiliary I/O 128, the keyboard 132, the clickable thumbwheel 230, and the like, and for facilitating output to the user. In accordance with an embodiment of the invention, there are provided software modules 206 for updating address information as will be described below. Though not shown, one or more applications for managing communications or for providing personal digital assistant like functions may also be included.

Thus, the wireless device 210 includes computer executable programmed instructions for directing the device 210 to implement the embodiments of the present invention. The programmed instructions may be embodied in one or more software modules 206 resident in the memory 201 of the wireless device 210. Alternatively, the programmed instructions may be embodied on a computer readable medium (such as a CD disk or floppy disk) which may be used for transporting the programmed instructions to the memory of the wireless device 210. Alternatively, the programmed instructions may be embedded in a computer-readable, signal-bearing medium that is uploaded to a network by a vendor or supplier of the programmed instructions, and this signal-bearing medium may be downloaded through an interface 111, 131, 141 to the wireless device 210 from the network by end users or potential buyers.

Figure 4:
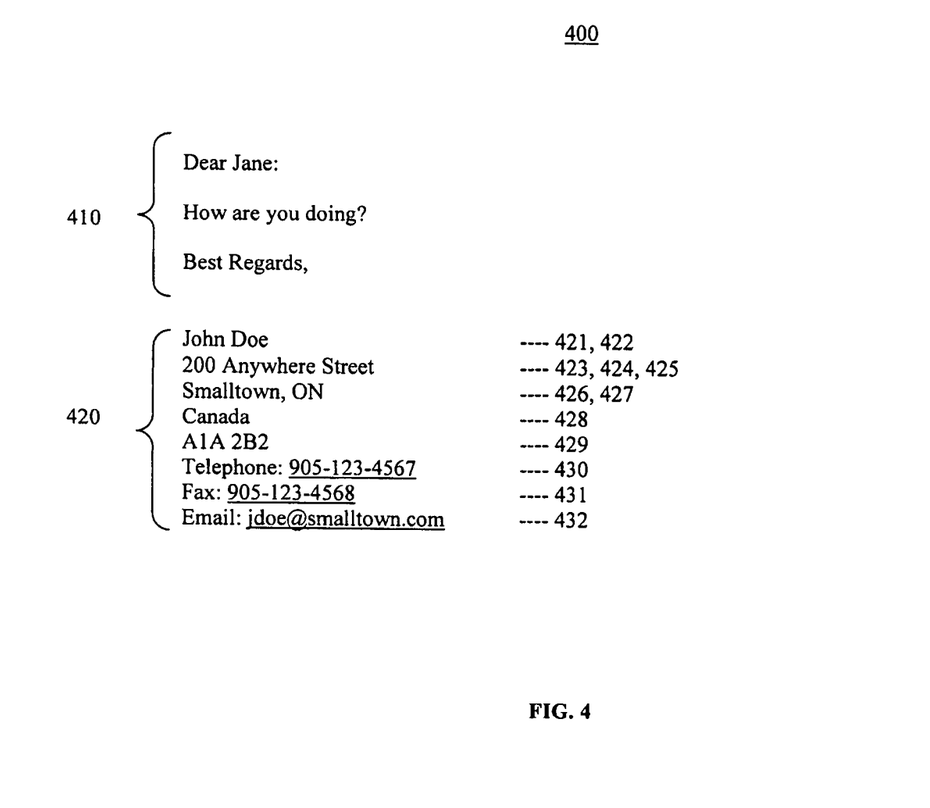
FIG. 4 is a partial screen capture illustrating the content of an exemplary opened email message.

FIG. 4 is a partial screen capture illustrating the content of an exemplary opened email message 400. The email message 400 is received by a second user ("Jane") from a first user ("John Doe") and is opened by the second user on the display screen 140, 122 of the second user's data processing system 100 or wireless device 210. The email message 400 includes message text 410 manually entered by the first user and auto signature text 420. The auto signature text 420 includes, for example, the following items of contact information for the second user: first and last (or full) name 421, 422 (e.g., "John Doe"); street address 422-425 (e.g., "200 Anytown Street"), city 426 (e.g., "Smalltown"), state or province 427 (e.g., "ON" for "Ontario"), country 428 (e.g., "Canada"), postal or ZIP code 429 (e.g., "A1A 2B2"), telephone number 430 (e.g., "905-123-4567"), fax number 431 (e.g., "905-123-4568"), and email address 432 (e.g., "jdoe@smalltown.com"). Note that the telephone number 430, fax number 431, and email address 432 are underlined in FIG. 4. These items 430-432 of contact information are recognized by the second user's email system and are underlined accordingly. According to one embodiment, rather than being contained in the auto signature text 420, the items of contact information 421-432 may be contained in the message text 410.

Figure 5:
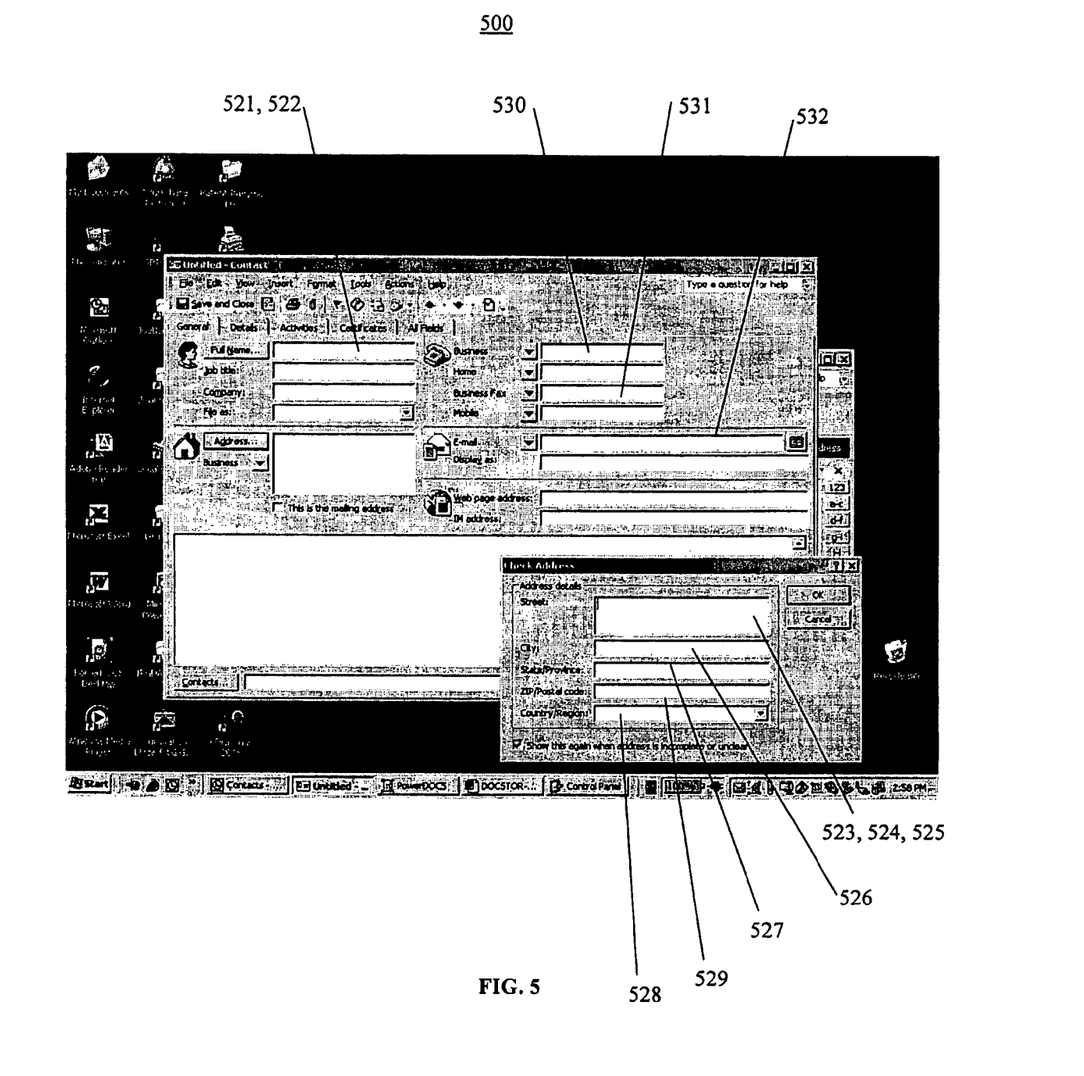
FIG. 5 is a screen capture illustrating an exemplary email address book input screen.

FIG. 5 is a screen capture illustrating an exemplary email address book input screen 500. The address book input screen 500 has respective fields 521-532 for receiving the contact information 421-432.

Now, recall the problem described above. When the second user receives new or updated address information (e.g., street 423-425, city 426, state or province 427, country 428, postal or ZIP code 429) from a first user via email 400, the second user will typically wish to add this new or updated information to the second user's address book function maintained by the second user's data processing system 100 or wireless device 210. The address book function typically stores a list of contacts in a database. A record is maintained for each contact and the contact information may be presented for editing, etc., through a multi-field input screen 500 or graphical user interface. One problem with current data processing systems and wireless devices is that they do not provide effective means of facilitating the addition of new or updated address information 423-429 to address books when the new or updated information is received by email 400. Presently, if a user wants to add new or updated address information 423-429 to their address book, the user has to copy each item of address information 423-429 from the source email 400 individually, switch to their address book input screen 500, and then paste the item 423-429 into the appropriate field on the address book input screen 500. As mentioned, this can be time consuming and frustrating process for the second user. In general, the present invention provides means for updating email address books by detecting and importing address information 423-429 in email messages 400 received by wireless device 210 and other systems 100.

Figure 6:
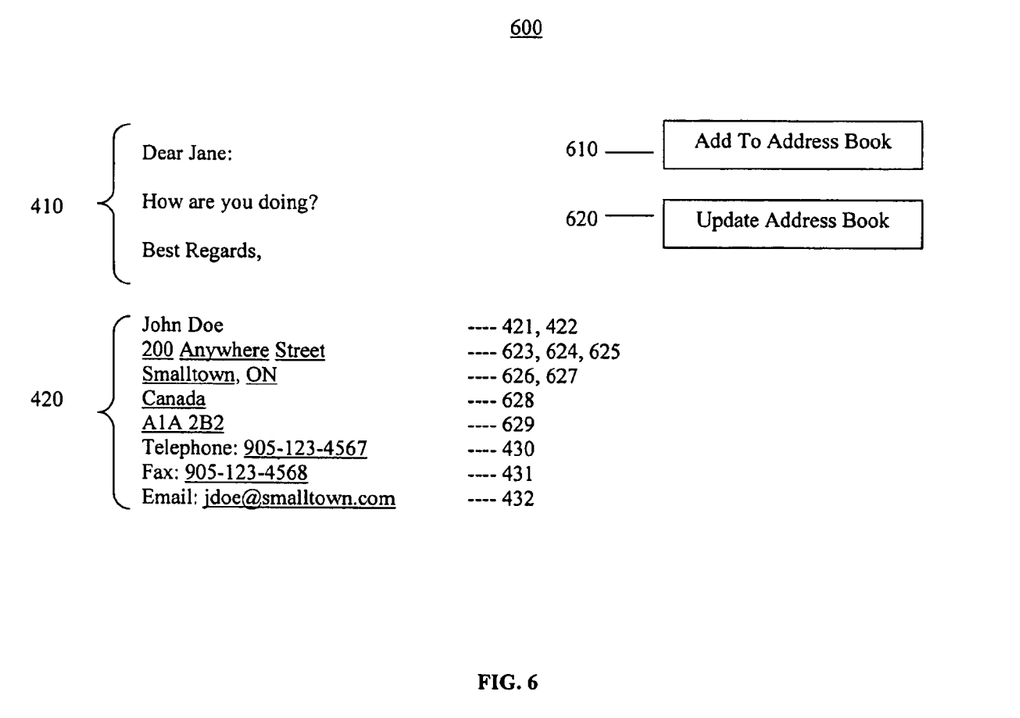
FIG. 6 is a partial screen capture illustrating a graphical user interface ("GUI") for updating an email address book input screen with address information contained in the email message of FIG. 4 in accordance with an embodiment of the invention; and, FIG. 7 is a flow chart illustrating operations of modules for updating an email address book in accordance with an embodiment of the invention.

FIG. 6 is a partial screen capture illustrating a graphical user interface ("GUI") 600 for updating an email address book input screen 500 with address information 423-429 contained in the email message 400 of FIG. 4 in accordance with an embodiment of the invention. The GUI 600 is displayed on the display screen 122, 140 of the wireless device 210 or data processing system 100 and may be incorporated in the GUI 180, 204 associated with email applications 170, 206 running on the wireless device 210 or data processing system 100.

The GUI 600 provides means such as underlining 623-629 for identifying items of address information 423-429 that have been found in the email message 400. According to one embodiment, alternate text colouring (e.g., red, blue, etc.) is used as the means for identifying items of address information found in the email message. In addition, the GUI 600 has a menu item 610 (e.g., "Add to Address Book") for adding one or more identified items of new address information to the address book input screen 500 and a menu item 620 (e.g., "Update Address Book") for updating one or more identified items of updated address information to the address book input screen 500. The menu items 610, 620 may appear in a pull-down or pop-up menu (not shown). According to one embodiment, the menu items 610, 620 may appear in the pull-down menu only if the user highlights one of the items of address information 423429 and then opens the pull-down menu. According to another embodiment, the menu items 610, 620 are buttons that may be presented within an open email message 400.

In operation, when a user opens a message 400 on the display screen 122, 140 of the wireless device 210 or data processing system 100, software modules 206, 170 within the wireless device 210 or data processing system 100 perform operations to scan or search for items of address information 423-429 in the message text 410 and/or auto signature text 420 of the email message 400. Items of address information 423-429 that are identified or found by the search are underlined or otherwise identified 623-629 in the email message 400. In addition, menu items or buttons 610, 620 are presented to the user for providing instructions to the wireless device 210 or data processing system 100 to update the email address book with the address information 423-429.

To determine if message or auto signature text 410, 420 contains items of address information 423-429, and where that information is located in the text for subsequent identification, the content of the message or auto signature text 410, 420 is searched for words and abbreviations that are associated with common address information as follows:

1) A search is performed for words and abbreviations designating a street type 425 (e.g., Street, St., Drive, Dr., Avenue, Ave., Crescent, Cres., Cr., etc.). The street number 423 (e.g., 200) and street name 424 (e.g., Anywhere) will be located just before the street type (e.g., Street) in the email text 410, 420.
2) A search is performed for city or town names (e.g., Toronto, Buffalo, etc.) 426.
3) A search is performed for province and state names (e.g., Ontario, New York, etc.) and abbreviations (e.g., ON for Ontario, NY for New York, etc.) 427.
4) A search is performed for country names and abbreviations (e.g., Canada, CA, United States, US, etc.) 428.
5) A search is performed for postal and ZIP codes (e.g., A1A 2B2, 12345-6789, etc.) 429. Postal and ZIP codes have standard formats that can facilitate the searching. For example, a Canadian postal code consists of two groups of three characters. The first group of characters has the format letter-number-letter and the second group of characters has the format number-letter-number. As another example, a United States ZIP code has a first group of five numbers that is separated by a dash from a second group of four numbers.

A set of rules is then used to determine if the items of information found by the above search represent an address. For example, if only one of the above items of information is found in a given length of text, then a determination will be made that the item is not associated with an address. As another example, if three or more of the above items of information are found in a given length of text, then a determination will be made that those items are associated with an address. If a determination is made that the items of information found are items of address information 423-429, then those items are underlined 623-629 in the message 400.

After the items of address information 423-429 have been found and underlined 623-629, one of the "Add To Address Book" menu item 610 and the "Update Address Book" menu item 620 is presented to the user in the menu for the email application. To determine which of the menu items 610, 620 is presented to the user, a lookup is conducted in the address book based on one or more of the items of address information 423-429 found or based on a unique item of contact information (e.g., first and last name 421, 422 telephone number 430, 431 email address 432, personal identification number ("PIN") (not shown)). If no entries in the address book are found by this lookup, the "Add To Address Book" menu item 610 is presented. If one entry in the address book is found, the "Update Address Book" menu item 620 is presented. If multiple entries in the address book are found, then the "Update Address Book" menu item 620 is again presented and when the user selects this menu item. A dialog (not shown) is presented allowing for a choice of which of the multiple entries is to be updated.

Thus, the "Add To Address Book" menu item 610 is presented when none of the items of address information 423-429 found matches the content of corresponding fields 523-529 in the records of the address book. In this case, the user has the option of creating a new record or contact for the user's address book. The user may create a new contact by clicking on the "Add To Address Book" menu item 610. When this is done, a new contact is created for the address book and the address fields 523-529 in the new contact are populated with the items of address information 423-429 found in the email 400. The user is then presented with the address book input screen 500 for the new contact so that the user can verify that the items of contact information presented thereon are correct and so that the user may enter any additional contact information desired.

The "Update Address Book" menu item 620 is for the case when a contact is found in the address book using the items of address information 423-429 found in the email 400 but, either some of the items of address information 423429 differ from the existing contact information or some the items of address information 423-429 represent new information. When the user clicks on the "Update Address Book" menu item 620, the existing contact is opened and the contact information is updated. The new information may be hi-lighted in some manner (e.g., presented in a red colour) and any conflicts between existing information and the items of address information 423-429 found in the email 400 can be presented to the user for resolution.

Advantageously, the use of the "Add To Address Book" and "Update Address Book" menu items 610, 620 allows the user to quickly add new contact information and update existing contact information in the user's address book.

According to one embodiment, the email message 400 can be a peer-to-peer message ("PIN message") and the email text 410, 420 can be PIN message text (not shown). A personal identification number ("PIN") is a number that is used to identify a wireless device 210 on a wireless network 220. Some wireless service providers allow for peer-to-peer messaging between wireless devices using PIN numbers as destination addresses. If a first user knows the PIN of a second user's wireless device, the first user can add that PIN to the first user's address book and use it to send a PIN message directly to the wireless device of the second user without passing through an email server.

According to another embodiment, the email message 400 can be a Short Message Service ("SMS") message and the email text 410, 420 can be SMS message text (not shown). Note that SMS messages are limited to 160 characters.

According to another embodiment, if the email address 432 (or PIN for a PIN message or SMS-compatible number for a SMS message) of the email sender is not included in the text 410, 420 of the email 400, then the email address field 532 of the contact can be populated using the email address (or PIN or SMS-compatible number) of the email message 400.

Figure 7:
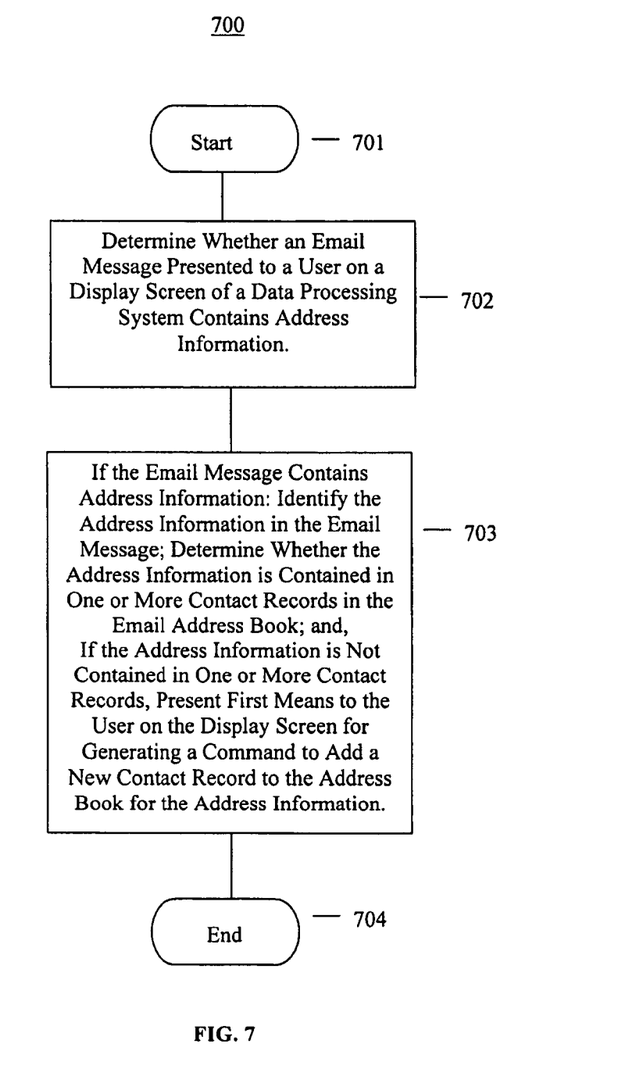

The above described method may be summarized with the aid of a flowchart. FIG. 7 is a flow chart illustrating operations 700 of modules 170 for updating an email address book in accordance with an embodiment of the invention.

At step 701, the operations 700 start.

At step 702, a determination is made as to whether an email message 400 presented to a user on a display screen 140 of a data processing system 100 contains address information 423-429.

At step 703, if the email message 400 contains address information 423-429: the address information 423-429 is identified 623-629 in the email message 400; a determination is made as to whether the address information 423-429 is contained in one or more contact records in the email address book; and, if the address information 423-429 is not contained in one or more contact records, first means 610 are presented to the user on the display screen 140 for generating a command to add a new contact record to the address book for the address information 423-429.

At step 704, the operations 700 end.

Optionally, the method further includes, if the address information 423-429 is contained in one or more contact records, presenting second means 620 to the user on the display screen 140 for generating a command to add the address information 423-429 to the one or more contact records and to identify the address information 423-429 in the one or more contact records. Optionally, the method further includes: displaying an input screen 500 to the user for the new contact record or the one or more contact records; and, receiving input from the user to at least one of: add information to the new contact record or to the one or more contact records; and, correct information in the new contact record or in the one or more contact records. Optionally, the identifying is underlining 623-629, the address information 423-429 being underlined in the email message 400. Optionally, the first and second means 610, 620 are at least one of a first and a second menu item 610, 620 and a first and a second button icon, respectively. Optionally, the address information 423-429 includes one or more items, the one or more items including at least one of: a street type 425, a street type abbreviation, a street number 423, a street name 424, a city name 426, a province name, a province name abbreviation 427, a state name, a state name abbreviation, a country name 428, a country name abbreviation, a postal code 429, a ZIP code, a telephone number 430, a fax number 431, an email address 432, and a personal identification number ("PIN"). Optionally, the step of determining whether the email message 400 contains address information 423-429 further includes: searching for at least one of the one or more items in the email message 400; identifying a number of the one or more items in a section (e.g., 410, 420) of the email message 400; and comparing the number to a predetermined number to determine if the one or more items represent an address. Optionally, the data processing system 100 is a wireless device 210 having a clickable thumbwheel 230. Optionally, the method further includes opening the email message 400 on the display screen 140 when the email message 400 is selected from a list of email messages by the user with the clickable thumbwheel 230.

The above described method for updating address information can be performed by the data processing system 100. In an alternate embodiment of the invention, the method can be performed by the wireless device 210.

While this invention is primarily discussed as a method, a person of ordinary skill in the art will understand that the apparatus discussed above with reference to a wireless device 210 and a data processing system 100, may be programmed to enable the practice of the method of the invention. Moreover, an article of manufacture for use with a wireless device 210 or data processing system 100, such as a pre-recorded storage device or other similar computer readable medium including program instructions recorded thereon, may direct the wireless device 210 or data processing system 100 to facilitate the practice of the method of the invention. It is understood that such apparatus and particles of manufacture also come within the scope of the invention.

The embodiments of the invention described above are intended to be exemplary only. The scope of the invention is therefore intended to be limited solely by the scope of the appended claims.

A portion of the disclosure of this patent document contains material which is subject to copyright protection. The copyright owner has no objection to the reproduction by any one of the patent document or patent disclosure, as it appears in the Patent and Trademark Office patent file or records, but otherwise reserves all copyrights whatsoever.

What is claimed is:

1. A method of updating an address book maintained by a data processing system, comprising:
    identifying a plurality of items of address information within a message field of an email message;
    determining whether one of the items is contained in more than one contact record of the address book;
    if the one item is contained in more than one contact record of the address book, presenting a dialog allowing a choice of which of the more than one contact record is to be updated;
    receiving an input to update a chosen contact record of the address book with an other one of the items of address information contained in the message field of the email message; and
    displaying an updated contact record with the other one item hi-lighted;
    wherein the identifying the plurality of items of address information comprises: identifying a number of items of address information in the message field of the email message; and comparing the number to a predetermined number to determine if the plurality of items comprises an address.

2. The method of claim 1, further comprising: displaying an input screen for the chosen contact record; and,
    receiving input to at least one of: update information in the chosen contact record or correct information in the chosen contact record.

3. The method of claim 1, wherein the identifying includes one of: underlining and text coloring.

4. The method of claim 1, wherein the plurality of items of address information includes at least one of: a street type, a street type abbreviation, a street number, a street name, a city name, a province name, a province name abbreviation, a state name, a state name abbreviation, a country name, a country name abbreviation, a postal code, a ZIP code, a telephone number, a fax number, an email address, and a personal identification number ("PIN").

5. The method of claim 4, wherein identifying the plurality of items of address information comprises: searching for at least one of the plurality of items in the email message.

6. The method of claim 1, wherein the email message is one of a short message system ("SMS") message and a peer-to-peer message.

7. The method of claim 1, wherein the data processing system is a wireless device.

8. The method of claim 7, further comprising opening the email message on the display screen when the email message is selected from a list of email messages.

9. A system of updating an address book maintained by a data processing system, comprising:
- a processor coupled to memory for storing the address book, to a display screen, and to an interface to a network, and adapted to:
- identify a plurality of items of address information within a message field of an email message;
- determine whether one of the items is contained in more than one contact record of the address book;
- if the one item is contained in more than one contact record of the address book, present a dialog allowing a choice of which of the more than one contact record is to be updated;
- receive an input to update a chosen contact record of the address book with an other one of the items of address information contained in the message field of the email message; and
- display an updated contact record with the other one item hi-lighted;
- wherein identifying the plurality of items of address information comprises: identifying a number of items of address information in the message field of the email message; and comparing the number to a predetermined number to determine if the plurality of items comprises an address.

10. The system of claim 9, wherein the processor is further adapted to: display an input screen for the chosen contact record, and receive input to at least one of: update information in the chosen contact record or correct information in the chosen contact record.

11. The system of claim 9, wherein the identifying includes one of: underlining or text coloring.

12. The system of claim 9, wherein the plurality of items of address information includes at least one of: a street type, a street type abbreviation, a street number, a street name, a city name, a province name, a province name abbreviation, a state name, a state name abbreviation, a country name, a country name abbreviation, a postal code, a ZIP code, a telephone number, a fax number, an email address, and a personal identification number ("PIN").

13. The system of claim 9, wherein the processor is adapted for: searching for at least one of the plurality of items in the email message.

14. The system of claim 9, wherein the email message is one of a short message system ("SMS") message and a peer-to-peer message.

15. The system of claim 9, wherein the system is a wireless device.

16. The system of claim 15, wherein the processor is further adapted to open the email message on the display screen when the email message is selected from a list of email messages.

17. A computer program product having a non-transitory computer readable medium tangibly embodying computer executable code stored thereon for directing a data processing system to update an address book maintained by the data processing system, the computer program product comprising code for:
- identifying a plurality of items of address information within a message field of an email message;
- determining whether one of the items is contained in more than one contact record of the address book;
- if the one item is contained in more than one contact record of the address book, presenting a dialog allowing a choice of which of the more than one contact record is to be updated;
- receiving an input to update a chosen contact record of the address book with an other one of the items of address information contained in the message field of the email message; and
- displaying an updated contact record with the other one item hi-lighted;
- wherein identifying the plurality of items of address information comprises: identifying a number of items of address information in the message field of the email message; and comparing the number to a predetermined number to determine if the plurality of items comprises an address.

* * * * *